Patented Feb. 25, 1936

2,032,173

UNITED STATES PATENT OFFICE 2,032,173

DRY SOLUBLE CHLORINE COMPOUND

Arnold H. Johnson and Henning A. Trebler, Baltimore, Md., assignors to Sealtest System Laboratories, Inc., New York, N. Y., a corporation of Maryland No Drawing. Application August 3, 1935,
Serial No. 34,634

11 Claims. (Cl. 167—18)

This invention relates to a dry water-soluble chlorine compound in the form of a powder which is stable, and forms a clear solution having available chlorine in amount to produce an effective germicide and disinfectant.

Such compounds now known generally, are expensive, and while it has been suggested to use insoluble compounds which are less expensive, since a clear solution is desirable, such insoluble products are unsatisfactory.

The present invention aims to produce a dry chlorine compound in the form of a water-soluble power mixture which is stable, wherein the available chlorine will be present in desired percentage, and which will not be burdensome as to cost.

Further, as will be appreciated, another important consideration, aside from the matter of expense, is to produce a powder which will dissolve readily in water to give a clear solution. We have found that relatively inexpensive but ordinarily insoluble or difficultly soluble hypochlorites may be combined with suitable solubilizing compounds to produce a mixture which is soluble, i. e. the solubilizing agent yields soluble compounds of the cation of the hypochlorite on the alkaline side of neutrality in aqueous solution to give a perfectly clear solution wherein the chlorine is available in the required amount and wherein the germicidal solution is either non-corrosive or the degree of corrosiveness can be controlled.

An additional feature of the present invention resides in the use of an alkali earth metal hypochlorite which is normally water-insoluble or incompletely soluble, i. e., of very difficult water solubility, with an alkali metal phosphate which is water-soluble, whereby there is produced a germicidal powder mixture which yields soluble compounds with the cation of the hypochlorite, e. g. alkaline earth compounds on the alkaline side of neutrality in an aqueous solution.

Also we are enabled to employ chlorine compounds most efficiently in that a hypochlorite having a chlorine content which is relatively high, namely 60 to 70% is used so that the amount of available chlorine per unit quantity of the mixture is enhanced, while at the same time the amount of hypochlorite required is reduced, with consequent reduction in the amount of alkali metal phosphate necessary to hold the alkali earth metal in solution.

The germicidal mixture of the present invention, and the solution which is produced therefrom, are particularly useful in connection with dairy and food processing equipment which must be frequently cleaned and maintained in a thoroughly sanitary condition.

In carrying out the present invention, we use any of the usual hypochlorites, e. g., of the alkali earth metals. It is preferred to use a relatively inexpensive hypochlorite having a high chlorine content and one which has heretofore been considered impracticable for making clear solutions because of its insolubility or difficult solubility, such as calcium hypochlorite. The calcium hypochlorite we employ preferably has a chlorine content of 60 to 70% although we have used compounds of as low as 35%. The advantage of using a high chlorine content hypochlorite resides (1) in an enhanced amount of available chlorine, and (2) in the lower amount of hypochlorite required whereby a reduced quantity of solubilizing agent is necessary to hold the calcium in solution.

In order to produce a clear germicidal solution, using such hypochlorite, we mix with the hypochlorite any solubilizing compound which in the presence of water will cause the alkali earth metal, e. g., calcium to go into solution and which of itself is water-soluble. Also, this solubilizing compound is of a character to permit control of the pH by itself or by the addition of alkaline materials so that the corrosiveness of the germicidal solution can be regulated or corrosiveness prevented or reduced to a minimum.

The dry powder soluble chlorine compounds of this invention may contain up to substantially 20% by weight of available chlorine and are capable in aqueous solution of affording an amount of available chlorine substantially equal to the amount of available chlorine in the dry mixture.

It is also preferred that the solution will have a pH value above neutrality, e. g., in the range of from 9 to 11, usually pH 11. This is important in that by controlling the pH, the corrosive characteristic is effectively adjusted.

As to the solubilizing compounds which are combined with the hypochlorite to form the dry mixture, we prefer phosphates which give soluble alkali earth compounds on the alkaline side of neutrality in aqueous solution. There are a number of these which are suitable, of which we mention the various water soluble pyro and meta phosphates, of the alkali metals, preferably sodium hexa meta phosphate. Tetra sodium pyro phosphate may also be employed but is not preferred.

In some cases as where it is desirable to increase the pH in order to reduce corrosiveness and/or the chlorine content, water soluble silicates, phosphates and carbonates of the alkali metals, preferably sodium metasilicate (anhydrous), trisodium phosphate (monohydrate) and sodium carbonate (anhydrous), are added to the hypochlorite meta phosphate mixtures. If desired, mixtures of two or more of these alkaline compounds can be so added to the hypochlorite-metaphosphate mixture, e. g., silicate and phosphate, silicate and carbonate, carbonate and phosphate, or carbonate, phosphate and silicate. That is to say, while the hypochlorite-metaphosphate mixture itself, gives solutions which are sufficiently non-corrosive for most commercial purposes, it may in certain instances be desirable to have a mixture with minimum corrosiveness and/or lower chlorine content, and under these circumstances a suitable amount of alkali compound or mixtures thereof is added. In this manner, water-soluble mixtures having available chlorine in any desired amount up to substantially 20% may be produced.

It will be appreciated, of course, that the addition of the alkali compounds will raise the pH, and/or increase the alkalinity. It is to be understood that the pH and the alkalinity will be so controlled as to regulate the corrosive character of the solution, which is preferably maintained on the alkaline side of the neutrality.

The resultant powder mixture has been stored for considerable periods and found highly satisfactory for use, in that the available chlorine content has been in nowise impaired. This is particularly important in that it enables the product to be manufactured on a large scale, shipped in bulk and stored without fear of losing its strength.

As an example of a preferred product which has been found satisfactory and relatively inexpensive, we employ one pound of calcium hypochlorite (chlorine substantially 60-70%) and three pounds of sodium hexa meta phosphate producing a mixture containing four pounds of the dry soluble chlorine compound and having substantially fifteen per cent available chlorine. The cost of this mixture which produces a clear aqueous solution in water having about fourteen grains of hardness, is considerably less than the cost of a similar quantity of the mixtures now available which are capable of producing a clear solution of similar germicidal effectiveness.

When a mixture containing less available chlorine is desired, e. g. substantially 5%, we employ one pound of calcium hypochlorite (chlorine substantially 60-70%) three pounds of sodium hexa meta phosphate and eight pounds of soda ash so that the mixture contains twelve pounds. This likewise may be prepared at a cost considerably less than that of present available mixtures which give a clear aqueous solution and exhibit a similar germicidal effectiveness.

When the mixture of the present invention is added to water, there takes place a chemical reaction in which soluble compounds of the cation of the hypochlorite, e. g. calcium are formed and this solubility of the calcium and calcium compounds takes place on the alkaline side of neutrality.

The action of the solubilizing compound which is mixed with the hypochlorite is to react with and/or render the insoluble or difficultly soluble hypochlorite soluble in water to produce a clear solution without formation of any sediment and without injuring the available chlorine content and the value of the solution as a germicide. We have found that where such chlorine content is in amount of substantially fifteen per cent, that the compound is soluble in water having a hardness as high as fourteen grains per gallon and yields a clear solution having a chlorine concentration, for example, of 500 ppm.

As stated, additional amounts of the alkaline material may be added to reduce the chlorine content where desired, as well as to raise the pH. It will be understood that the amount of solubilizing agent may be decreased as desired as long as solubility of the hypochlorite is obtained. Likewise, the concentration of chlorine in the mixture may be varied within wide limits as required. In this connection, in lieu of alkaline materials we use inert soluble materials of various kinds whenever it is desired to reduce the chlorine content of the dry mixture without reducing its corrosiveness or increasing the alkalinity or pH. For example, sodium chloride, or other chlorides of the alkali metals are useful, the particular qualifications being that such compounds be inert and water-soluble.

The term "water-soluble", whether applied to the ingredients of the mixture or to the germicidal mixture itself, is intended to mean, in this specification, an optically clear solution in water in which no visible sediment persists.

The dry mixture is dissolved in accordance with general practice in water which is cold or lukewarm as desired, e. g., 40° to 100° F.

The term "compound" as applied to the dry mixture of this invention is used in its literal sense.

It will be appreciated that various types of dry soluble compounds including mixtures of the several constituents mentioned or their equivalents in varying proportions may be produced, all of which are comprehended within the scope of the present invention.

We claim:
1. A dry water-soluble chlorine compound comprising a difficultly soluble hypochlorite and a solubilizing agent for the same comprising a phosphate which yields soluble compounds of the cation of the hypochlorite on the alkaline side of neutrality in aqueous solution.

2. A dry water-soluble chlorine compound comprising an alkali earth metal hypochlorite and a solubilizing agent for the same comprising a phosphate which yields soluble compounds of the cation of the hypochlorite on the alkaline side of neutrality in aqueous solution.

3. A dry water-soluble chlorine compound comprising a difficultly soluble hypochlorite and a solubilizing agent for the same comprising an alkali metal phosphate which yields soluble compounds of the cation of the hypochlorite on the alkaline side of neutrality in aqueous solution.

4. A dry water-soluble chlorine compound comprising an alkali earth metal hypochlorite and a solubilizing agent for the same comprising an alkali metal phosphate which yields soluble compounds of the cation of the hypochlorite on the alkaline side of neutrality in aqueous solution.

5. A dry water-soluble chlorine compound comprising calcium hypochlorite and a solubilizing agent for the same comprising a phosphate which yields soluble compounds of the cation of the hypochlorite on the alkaline side of neutrality in aqueous solution.

6. A dry water-soluble chlorine compound comprising a difficultly soluble hypochlorite and a solubilizing agent for the same comprising sodium hexametaphosphate which yields soluble ompounds of the cation of the hypochlorite on he alkaline side of neutrality in aqueous solution.

7. A dry water-soluble chlorine compound comrising calcium hypochlorite and a solubilizing gent for the same comprising sodium hexametaphosphate which yields soluble compounds f the cation of the hypochlorite on the alkaline ide of neutrality in aqueous solution.

8. A dry water-soluble chlorine compound comrising a difficultly soluble hypochlorite and a olubilizing agent for the same comprising tetraodium pyrophosphate which yields soluble compounds of the cation of the hypochlorite on the lkaline side of neutrality in aqueous solution.

9. A dry water-soluble chlorine compound comrising a difficultly soluble hypochlorite and a olubilizing agent for the same comprising a hosphate which yields soluble compounds of the ation of the hypochlorite on the alkaline side f neutrality in aqueous solution, and an alkali ompound selected from a group consisting of the water soluble silicates, phosphates and carbonates of the alkali metals.

10. A dry water-soluble chlorine compound comprising a difficultly soluble hypochlorite and a solubilizing agent for the same comprising a phosphate which yields soluble compounds of the cation of the hypochlorite on the alkaline side of neutrality in aqueous solution, and an alkali compound selected from a group consisting of soda ash, trisodium phosphate and sodium metasilicate.

11. A dry water-soluble chlorine compound comprising a calcium hypochlorite and a solubilizing agent for the same comprising sodium hexametaphosphate which yields soluble compounds of the cation of the hypochlorite on the alkaline side of neutrality in aqueous solution, and an alkali compound selected from a group consisting of soda ash, trisodium phosphate and sodium metasilicate.

ARNOLD H. JOHNSON.
HENNING A. TREBLER.